(12) United States Patent
Smith

(10) Patent No.: US 9,622,360 B1
(45) Date of Patent: Apr. 11, 2017

(54) MOVABLE DIGITAL DISPLAY FOR DISPLAYING SCENES WITHIN A WINDOW FRAME

(71) Applicant: Silas Smith, Dillon, MT (US)

(72) Inventor: Silas Smith, Dillon, MT (US)

( * ) Notice: Subject to any disclaimer, the term of this patent is extended or adjusted under 35 U.S.C. 154(b) by 0 days.

(21) Appl. No.: 14/873,903

(22) Filed: Oct. 2, 2015

(51) Int. Cl.
*H05K 5/00* (2006.01)
*F16M 13/02* (2006.01)

(52) U.S. Cl.
CPC .......... *H05K 5/0017* (2013.01); *F16M 13/02* (2013.01)

(58) Field of Classification Search
CPC ........ G06F 1/16; G06F 1/1615; G06F 1/1649; G06F 1/162; G06F 1/1618; H05K 5/0017; F16M 13/02
USPC .......................... 361/679.01, 679.02–679.09, 361/679.21–679.3, 679.55, 807, 810; 248/240, 284.1, 917–923
See application file for complete search history.

(56) References Cited

U.S. PATENT DOCUMENTS

| 5,253,051 A | 10/1993 | McManigal | |
|---|---|---|---|
| 6,144,417 A | 11/2000 | Yanagisawa | |
| D465,489 S | 11/2002 | Farber | |
| 6,726,164 B1* | 4/2004 | Baiza | G06F 1/1601 248/222.12 |
| 7,124,984 B2* | 10/2006 | Yokouchi | F16M 11/24 248/125.8 |
| 7,180,489 B2 | 2/2007 | Libby et al. | |
| 7,426,804 B2 | 9/2008 | Pylkki et al. | |
| 7,487,943 B1* | 2/2009 | Gillespie | F16M 11/04 248/279.1 |
| 8,333,355 B2* | 12/2012 | Stifal | F16M 11/10 248/276.1 |
| 8,724,037 B1* | 5/2014 | Massey | H04N 5/655 348/836 |
| 2002/0084395 A1* | 7/2002 | Johnson | A47B 46/005 248/276.1 |
| 2005/0280706 A1 | 12/2005 | Jong | |
| 2007/0023599 A1* | 2/2007 | Fedewa | F16M 11/10 248/284.1 |
| 2007/0221807 A1* | 9/2007 | Park | F16M 11/10 248/324 |
| 2011/0019344 A1* | 1/2011 | Russell | F16M 11/04 361/679.01 |
| 2013/0176667 A1* | 7/2013 | Kulkarni | F16M 11/10 361/679.01 |

(Continued)

FOREIGN PATENT DOCUMENTS

WO    WO2006129238    12/2006

*Primary Examiner* — Courtney Smith
*Assistant Examiner* — Sagar Shrestha

(57) ABSTRACT

A movable digital display includes pivotable left and right side brackets. Each of the brackets has a connector coupled to a first end of a rod. The connector pivotally attaches to a window frame. An orifice is positioned proximate a second end of the rod. Each of the brackets has a shaft with a first terminus and a second terminus. There is a fastener coupled to the first terminus of the shaft. The fastener is configured to pivotally attach to the digital display. There is an aperture proximate to the second terminus of the shaft. The aperture is complimentary to the orifice of the rod. Each of the brackets has a pivot pin extending through the orifice and the aperture, such that the rod and the shaft are coupled and such that the rod and the shaft are able to pivot relative to the pin.

7 Claims, 5 Drawing Sheets

(56) References Cited

U.S. PATENT DOCUMENTS

2013/0279090 A1* 10/2013 Brandt ............... H05K 7/00
                                                    361/679.01
2015/0250315 A1*  9/2015 Gross ............... F16M 11/10
                                                    361/679.01

* cited by examiner

MOVABLE DIGITAL DISPLAY FOR DISPLAYING SCENES WITHIN A WINDOW FRAME

BACKGROUND OF THE DISCLOSURE

Field of the Disclosure

The disclosure relates to movable digital displays and more particularly pertains to a new movable digital display for displaying scenes within a window frame.

SUMMARY OF THE DISCLOSURE

An embodiment of the disclosure meets the needs presented above by generally comprising a movable digital display, a pivotable left-side bracket, and a pivotable right side bracket. Each of the brackets has a rod with a first end and a second end. Each of the brackets has a connector coupled to the first end of the rod. The connector is configured to pivotally attach to the window frame. There is an orifice positioned proximate to the second end of the rod. Each of the brackets has a shaft with a first terminus and a second terminus. There is a fastener coupled to the first terminus of the shaft. The fastener is configured to pivotally attach to the digital display. There is an aperture proximate to the second terminus of the shaft. The aperture is complimentary to the orifice of the rod. Each of the brackets has a pivot pin extending through the orifice and the aperture, such that the rod and the shaft are coupled and such that the rod and the shaft are able to pivot relative to the pin.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
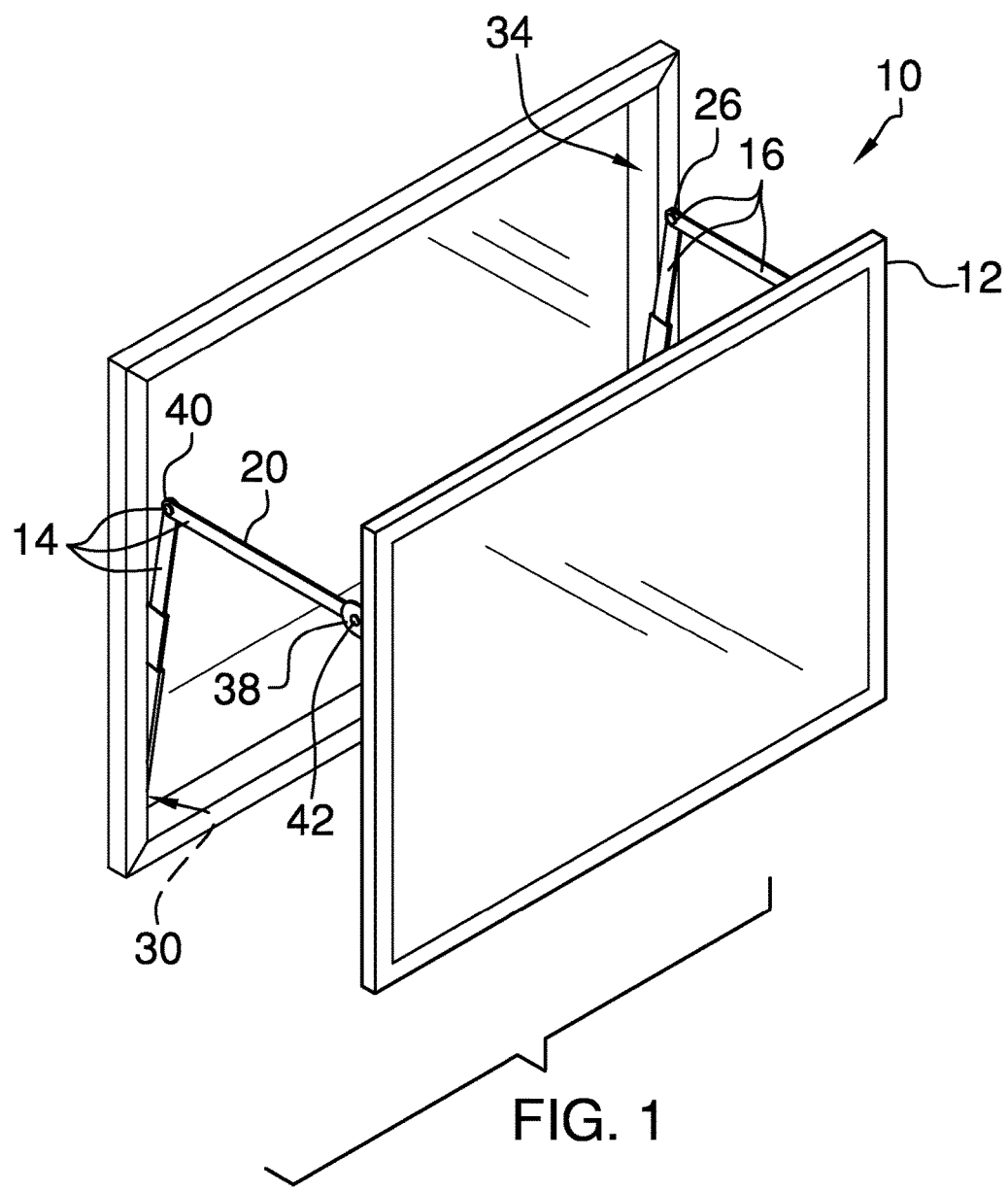
FIG. 1 is a perspective front view of a movable digital display for displaying scenes within a window frame according to an embodiment of the disclosure.
Figure 2:
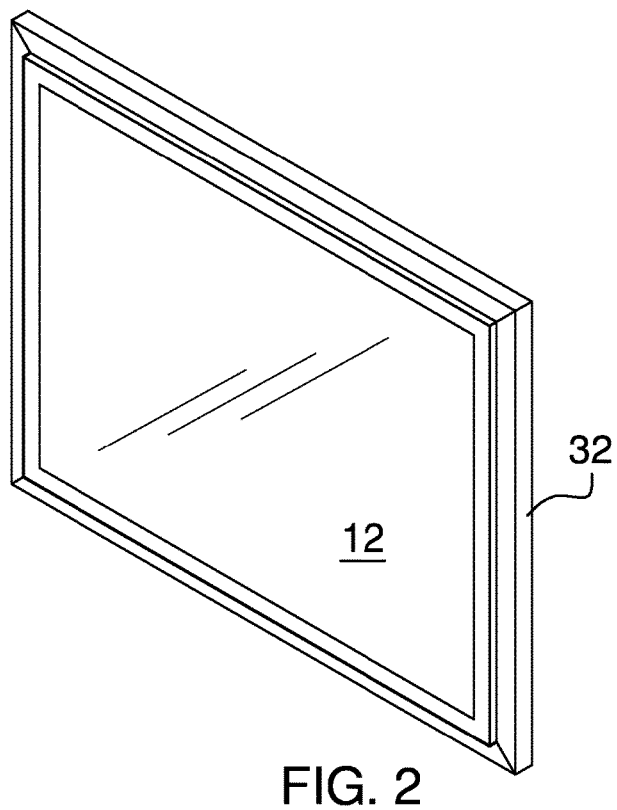
FIG. 2 is an in use view of an embodiment of the disclosure.
Figure 3:
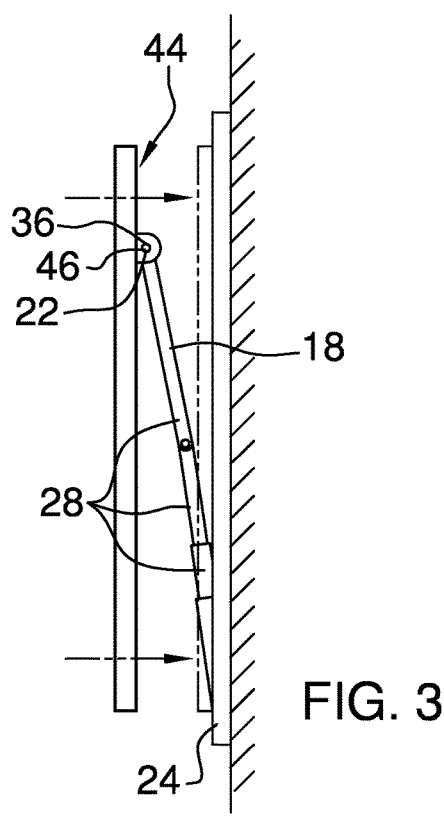
FIG. 3 is a side in use view of an embodiment of the disclosure.
Figure 4:
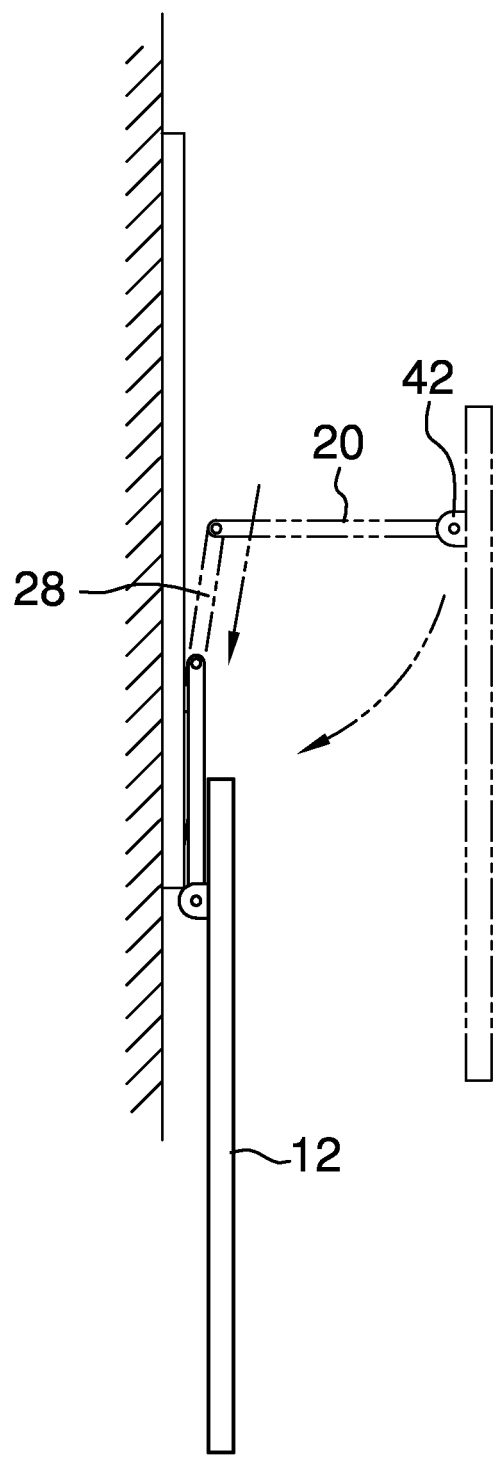
FIG. 4 is a side in use view of an embodiment of the disclosure.
Figure 5:
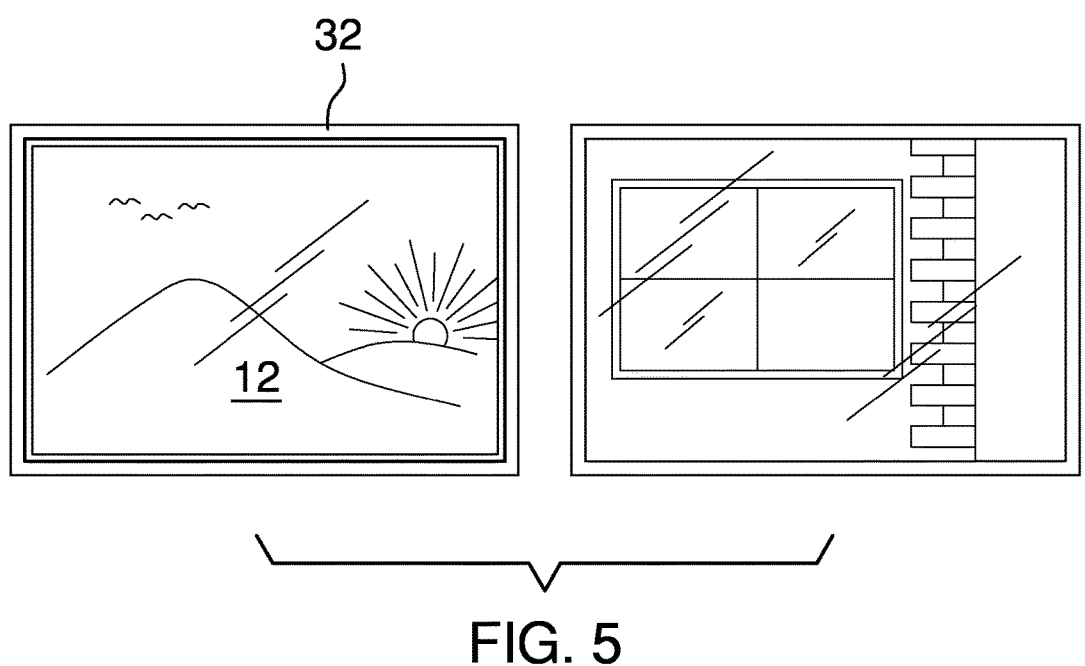
FIG. 5 is a front view of an embodiment of the disclosure.
Figure 6:
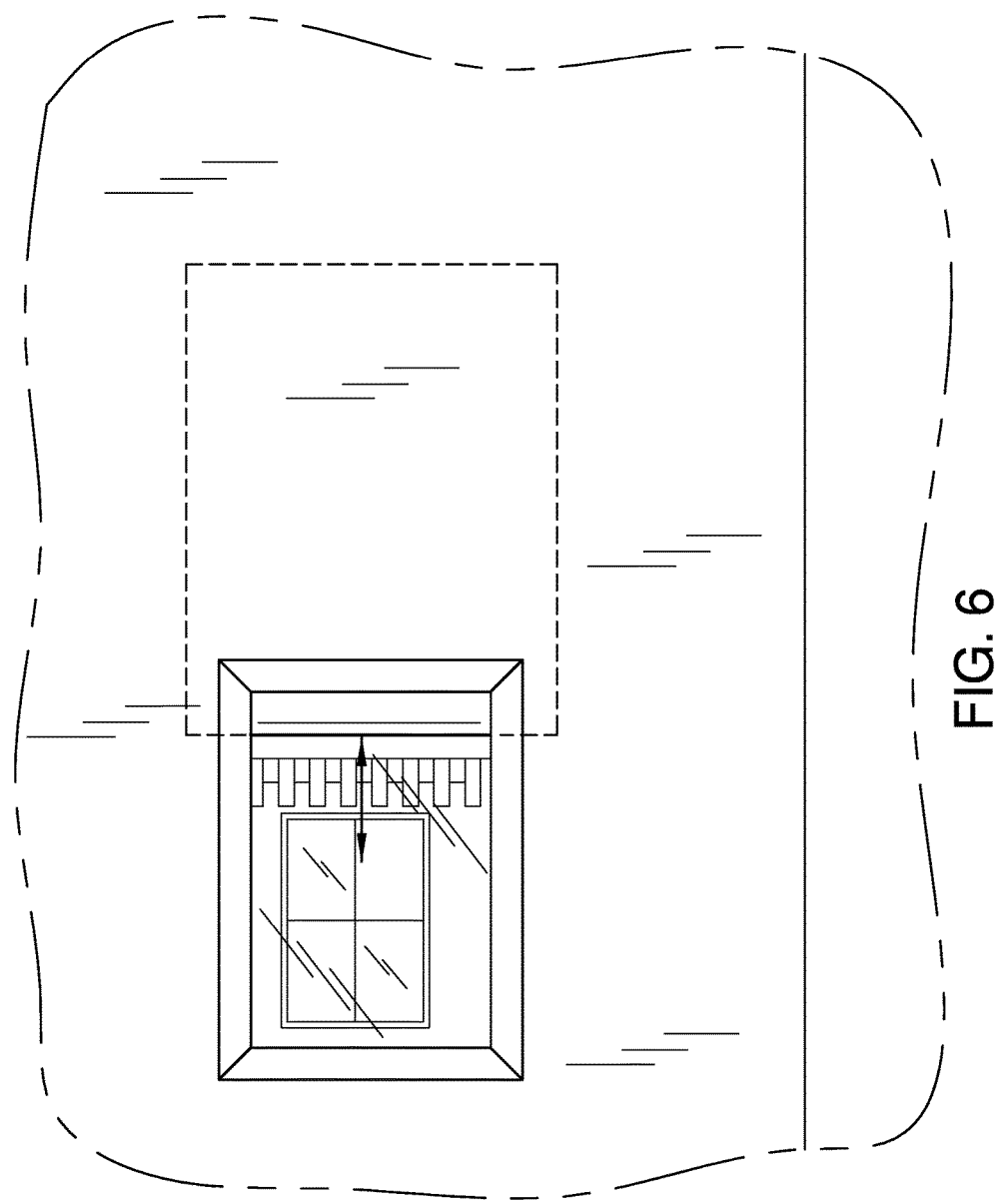
FIG. 6 is a front view of an embodiment of the disclosure.

With reference now to the drawings, and in particular to FIGS. 1 through 6 thereof, a new movable digital display embodying the principles and concepts of an embodiment of the disclosure and generally designated by the reference numeral 10 will be described.

As best illustrated in FIGS. 1 through 6, a movable digital display for displaying scenes within a window frame 10 generally comprises a digital display 12, a pivotable left-side bracket 14, and a pivotable right side bracket 16. The display 12 has a digital storage system, such that the digital storage system can be loaded with scenes to view on the display 12. The display 12 has a connection, such that the connection is able to receive live images via internet, satellite or cable signal to view on the display 12. The pivotable left-side bracket 14 and the pivotable right side bracket 16 each comprise a rod 18, a shaft 20, and a pin 22. The rod 18 has a first end 24 and a second end 26 and is extendable. The rod 18 has a plurality of selectively extendable nested sections 28 such that the rod 18 is telescopic. Preferably, the rod 18 has three nested sections. There is a connector 30 coupled to the first end 24 of the rod 18. The connector 30 is configured to pivotally attach to the window frame 32. Preferable, the connector 30 is configured to pivotally attach to the jamb 34 of the window frame 32. There is an orifice 36 positioned proximate to the second end 26 of the rod 18. The shaft 20 has a first terminus 38 and a second terminus 40, with a fastener 42 coupled to the first terminus 38 of the shaft 20. The fastener 42 is configured to pivotally attach to the digital display 12. Preferably, the fastener 42 is configured to pivotally attach to the back side 44 of the digital display 12. There is an aperture 46 proximate to the second terminus 40 of the shaft 20. The aperture 46 is complimentary to the orifice 36 of the rod 18. The pin 22 extends through the orifice 36 and the aperture 46.

In use, the connectors 30 are attachable to the window frame 32 and the fasteners 42 are attachable to the digital display 12, such that the display 12 is positionable in front of the window when the nested sections 28 of the rod 18 are in an extended position. Scenes stored in the digital storage system or received via the connection can be viewed on the display 12. When not in use, the digital display 12 can be repositioned out of the window when the nested sections 28 are in a nested position and the rod 18 and the shaft 20 are pivoted. In another embodiment of the invention, the digital display 12 is mounted within the wall next to the window and is movable from storage in the wall to an in-use position in front of the window.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A movable digital display for displaying scenes within a window frame, said device comprising a digital display, a pivotable left-side bracket, and a pivotable right side bracket, each of said brackets having:
   a rod, said rod having a first end and a second end,
   a connector, said connector being coupled to said first end of said rod, said connector being configured to pivotally attach to the window frame,
   an orifice, said orifice being positioned proximate to said second end of said rod,
   a shaft, said shaft having a first terminus and a second terminus,
   a fastener, said fastener being coupled to said first terminus of said shaft, said fastener being configured to pivotally attach to said digital display,
   an aperture, said aperture being proximate to said second terminus of said shaft, said aperture being complimentary to said orifice of said rod; and
   a pivot pin, said pin extending through said orifice and said aperture, wherein said rod and said shaft are coupled and wherein said rod and said shaft are able to pivot relative to said pin; and
   said rod being extendable, said rod having a plurality of selectively extendable nested sections wherein said rod is telescopic, wherein said connector is attachable to the window and said fastener is attachable to said digital display, wherein said display is positionable in front of the window when said nested sections of said rod are in an extended position, and wherein said digital display can be repositioned out of the window when said nested sections are in a nested position and said rod and said shaft are pivoted.

2. The device of claim 1, further comprising said display having a digital storage system, wherein said digital storage system can be loaded with scenes for viewing on said display.

3. The device of claim 1, further comprising said display having a connection, wherein said connection is able to receive live images via internet, satellite or cable signal for viewing on said display.

4. The device of claim 1, further comprising said rod having three nested sections.

5. The device of claim 1, further comprising said connector being configured to pivotally attach to the jamb of the window frame.

6. The device of claim 1, further comprising said fastener being configured to pivotally attach to the back side of said digital display.

7. A movable digital display for displaying scenes within a window frame, said device comprising:
   a digital display, said display having a digital storage system, wherein said digital storage system can be loaded with scenes for viewing on said display, said display having a connection, wherein said connection is able to receive live images via internet, satellite or cable signal for viewing on said display,
   a pivotable left-side bracket and a pivotable right side bracket, each of said brackets having:
   a rod, said rod being extendable, said rod having a first end and a second end, said rod having a plurality of selectively extendable nested sections wherein said rod is telescopic, said rod having three nested sections,
   a connector, said connector being coupled to said first end of said rod, said connector being configured to pivotally attach to the window frame, said connector being configured to pivotally attach to the jamb of the window frame,
   an orifice, said orifice being positioned proximate to said second end of said rod,
   a shaft, said shaft having a first terminus and a second terminus,
   a fastener, said fastener being coupled to said first terminus of said shaft, said fastener being configured to pivotally attach to said digital display, said fastener being configured to pivotally attach to the back side of said digital display,
   an aperture, said aperture being proximate to said second terminus of said shaft, said aperture being complimentary to said orifice of said rod; and
   a pivot pin, said pin extending through said orifice and said aperture, wherein said rod and said shaft are coupled, wherein said rod and said shaft are able to pivot relative to said pin, wherein said connectors are attachable to the window and said fasteners are attachable to said digital display, wherein said display is positionable in front of the window when said nested sections of said rod are in an extended position, and wherein said digital display can be repositioned out of the window when said nested sections are in a nested position and said rod and said shaft are pivoted.

* * * * *